US005711674A

United States Patent [19]

Chu

[11] Patent Number: 5,711,674

[45] Date of Patent: Jan. 27, 1998

[54] LAMP SOCKET AND PLUG ASSEMBLY

[76] Inventor: Shu-Hsun Chu, No. 1-2, Lane 975, Chun-Jih Road, Tao-Yuan, Taiwan

[21] Appl. No.: 616,179

[22] Filed: Mar. 15, 1996

[51] Int. Cl.[6] .......... A01R 39/00

[52] U.S. Cl. .......... 439/11

[58] Field of Search .......... 439/11, 13, 466, 439/31

[56] References Cited

U.S. PATENT DOCUMENTS 524,706 8/1894 Connell .......... 439/11

3,092,695 6/1963 Abrams .......... 439/11

FOREIGN PATENT DOCUMENTS 292769 11/1989 Japan .......... 439/31

*Primary Examiner*—Khiem Nguyen

*Assistant Examiner*—Eugene G. Byrd

*Attorney, Agent, or Firm*—Morton J. Rosenberg; David I. Klein; Jun Y. Lee

[57] ABSTRACT

A lamp socket and plug assembly which includes a plug holder, an adapter mounted in the plug holder, a plug coupled to the plug holder and turned horizontally by the adapter within 90° relative to the plug holder, and a lamp socket pivoted to the adapter to hold a lamp bulb and turned vertically within 90°.

4 Claims, 12 Drawing Sheets

LAMP SOCKET AND PLUG ASSEMBLY

BACKGROUND OF THE INVENTION (a) Field of the Invention

The present invention relates to a lamp socket and plug assembly, and relates more particularly to such a lamp socket and plug assembly which can be adjusted to fit the direction of the electric socket so as to keep the lamp bulb in vertical.

(b) Description of the Prior Art

Regular lighting fixtures for home use include ceiling fixtures, pendants, swag lamps, floor lamps, desk lamps, wall lamps, lamp socket and plug assemblies or the so-called night lamps, etc. FIG. 1 shows a lamp socket and plug assembly according to the prior art. This structure of lamp socket and plug assembly 1 comprises a lamp socket 1 which holds a lamp bulb 11 at one end and a lampshade 10 on the lamp bulb 11. The opposite end of the lamp socket terminates in a plug 12 with two blades 13 for connection to an electric socket. The lampshade 10 has a perfume receptacle at the top, which holds a perfume or deodorizer. This structure of lamp socket and plug assembly is designed for mounting in a horizontal electric socket only. If it is installed in a vertical electric socket, the lamp bulb 11 and the lampshade 10 will be maintained in horizontal, and the perfume or deordorizer may fall out of the perfume receptacle.

SUMMARY OF THE INVENTION

The present invention has been accomplished to provide a lamp socket and plug assembly which eliminates the aforesaid problem. It is one object of the present invention to provide a lamp socket and plug assembly which can be conveniently adjusted to change the angular position of the lamp socket subject to the type of the electric socket in which the lamp socket and plug assembly is to be installed. It is another object of the present invention to provide a lamp socket and plug assembly which can be conveniently adjusted to change the position of the blades horizontally within 90°. It is still another object of the present invention to provide a lamp socket and plug assembly which can be conveniently assembled subject to the specification of the electric socket used. According to one aspect of the present invention, the lamp socket and plug assembly comprises a plug holder, an adapter mounted in the plug holder, a plug coupled to the plug holder and turned horizontally by the adapter within 90° relative to the plug holder, and a lamp socket pivoted to the adapter to hold a lamp bulb and turned vertically within 90°. According to another aspect of the present invention, the plug can be installed with flat metal blades or rounded metal blades to fit different requirements.

DETAILED DESCRIPTION OF THE PREFERRED EMBODIMENT

Figure 1:
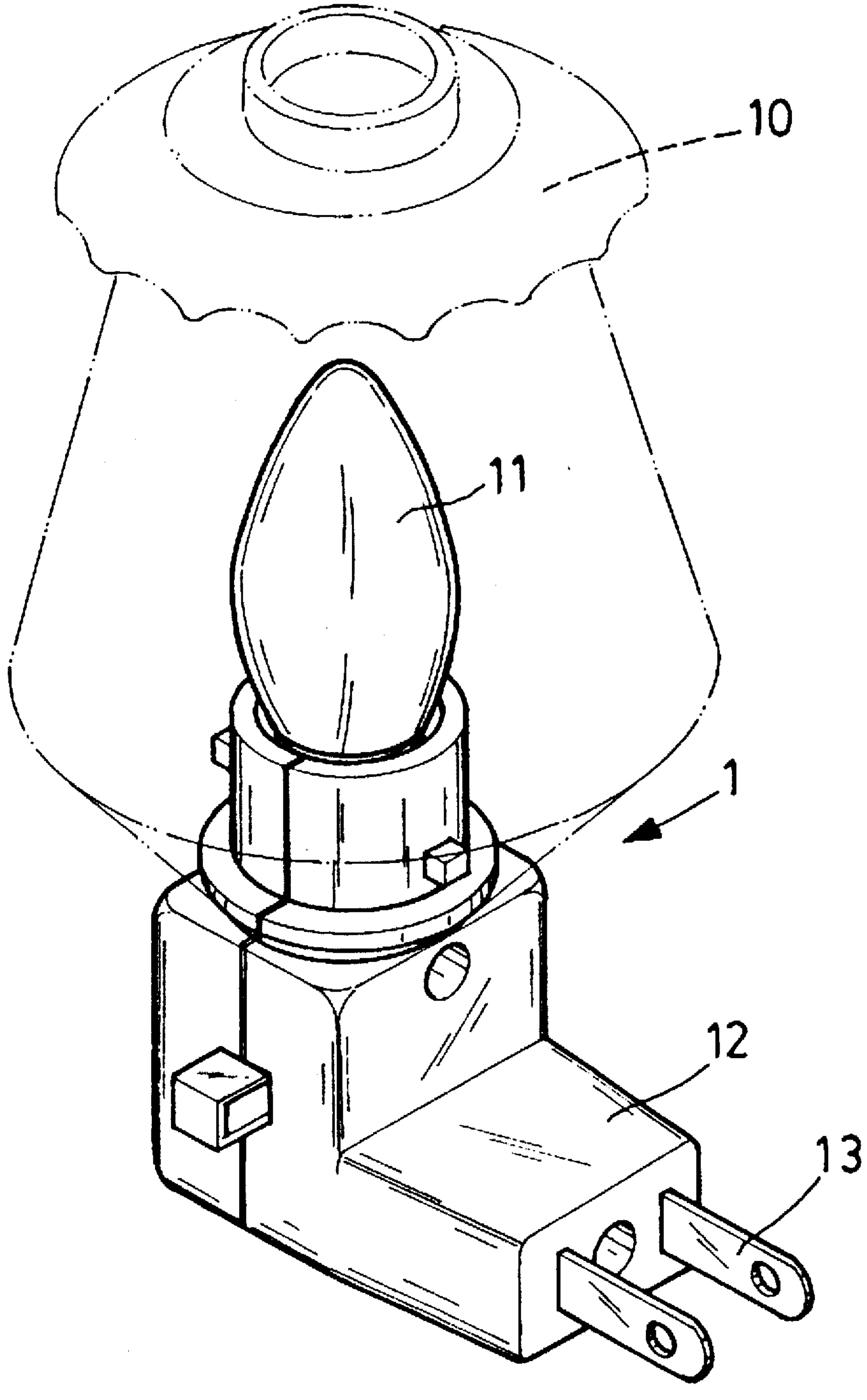
FIG. 1 (PRIOR ART)
FIG. 1 is an elevational view of a lamp socket and plug assembly according to the prior art.
Figure 2:
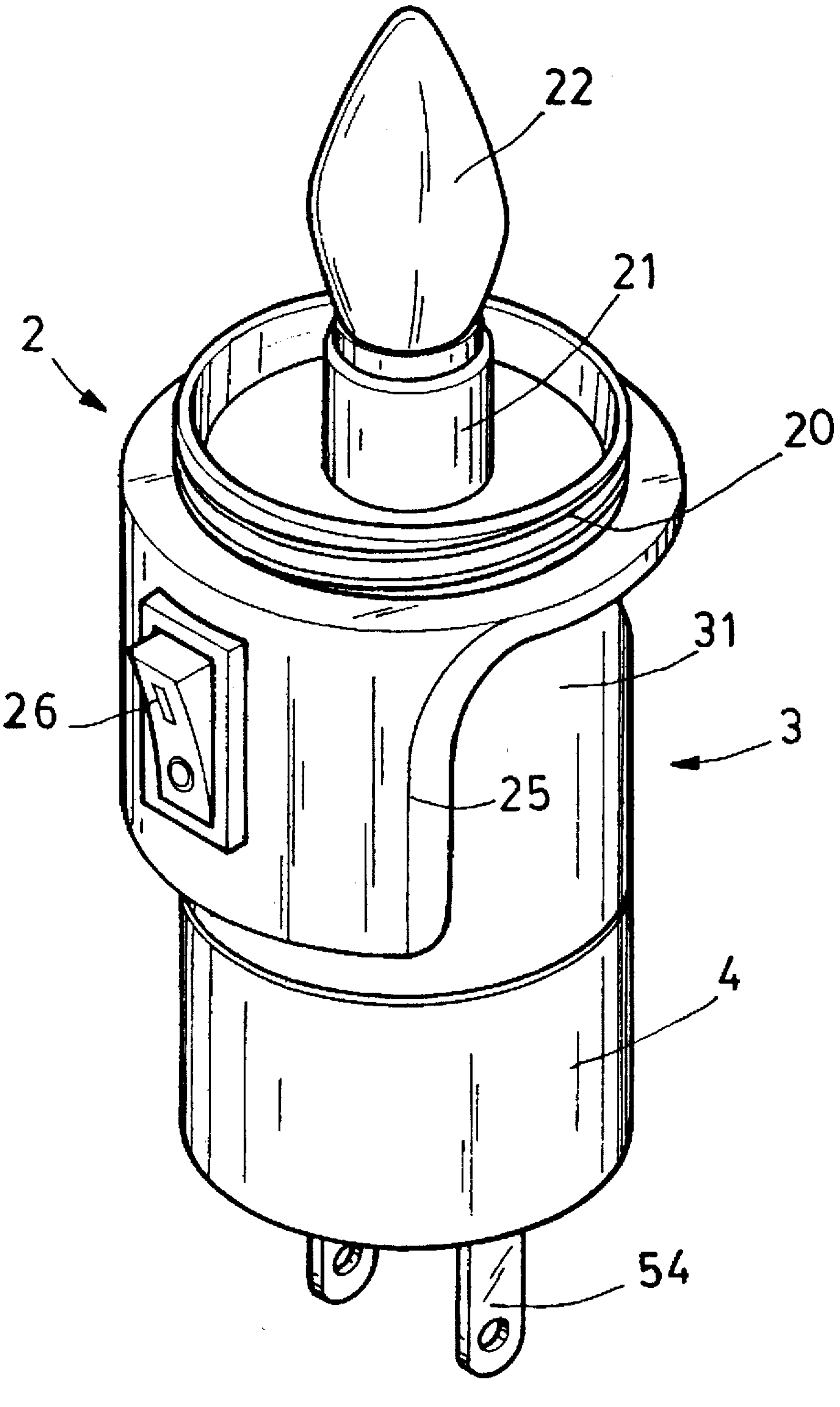
FIG. 2 is an elevational view of a lamp socket and plug assembly according to the present invention.
Figure 3:
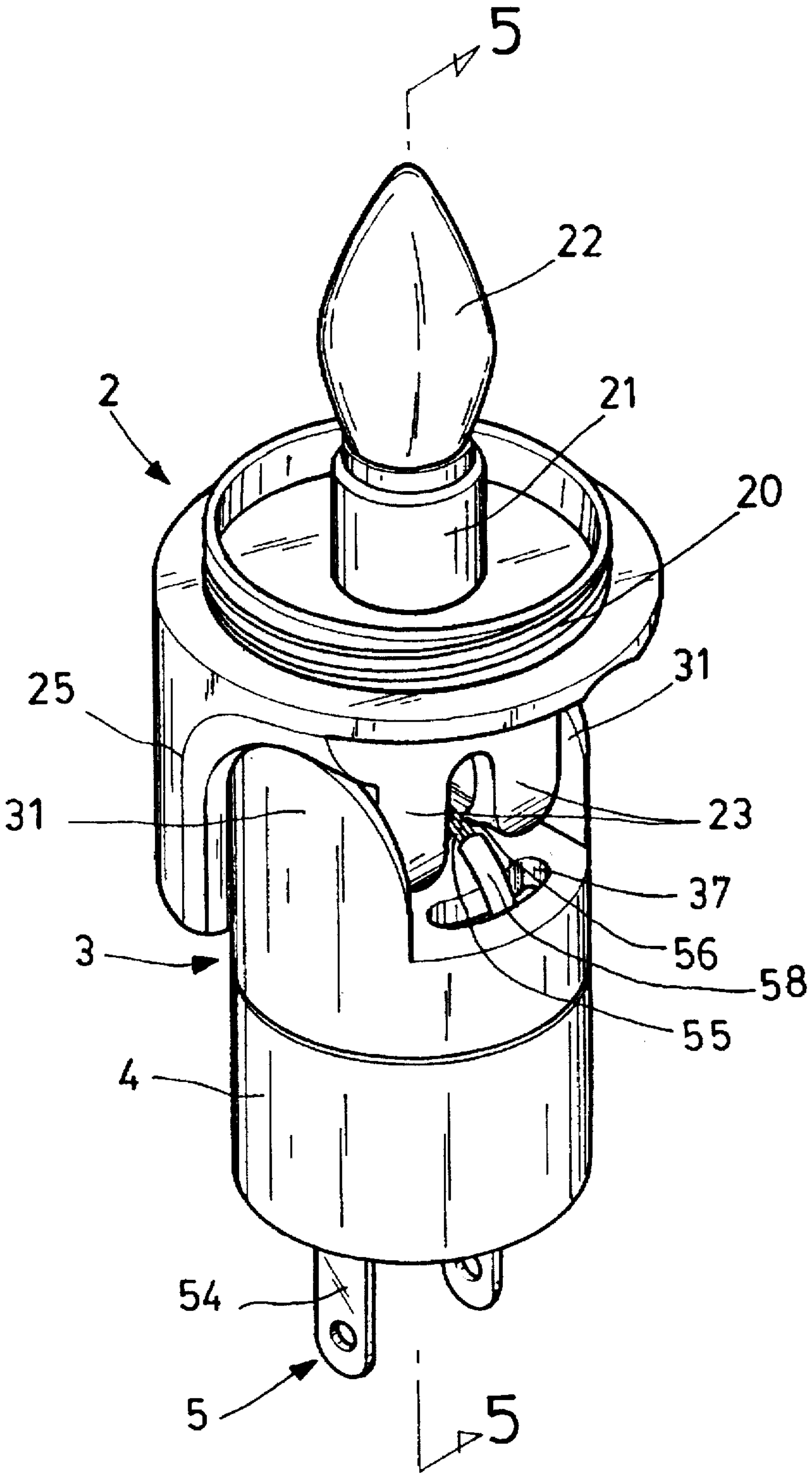
FIG. 3 is another elevational view of the lamp socket and plug assembly of the present invention when viewed from another angle.
Figure 4:
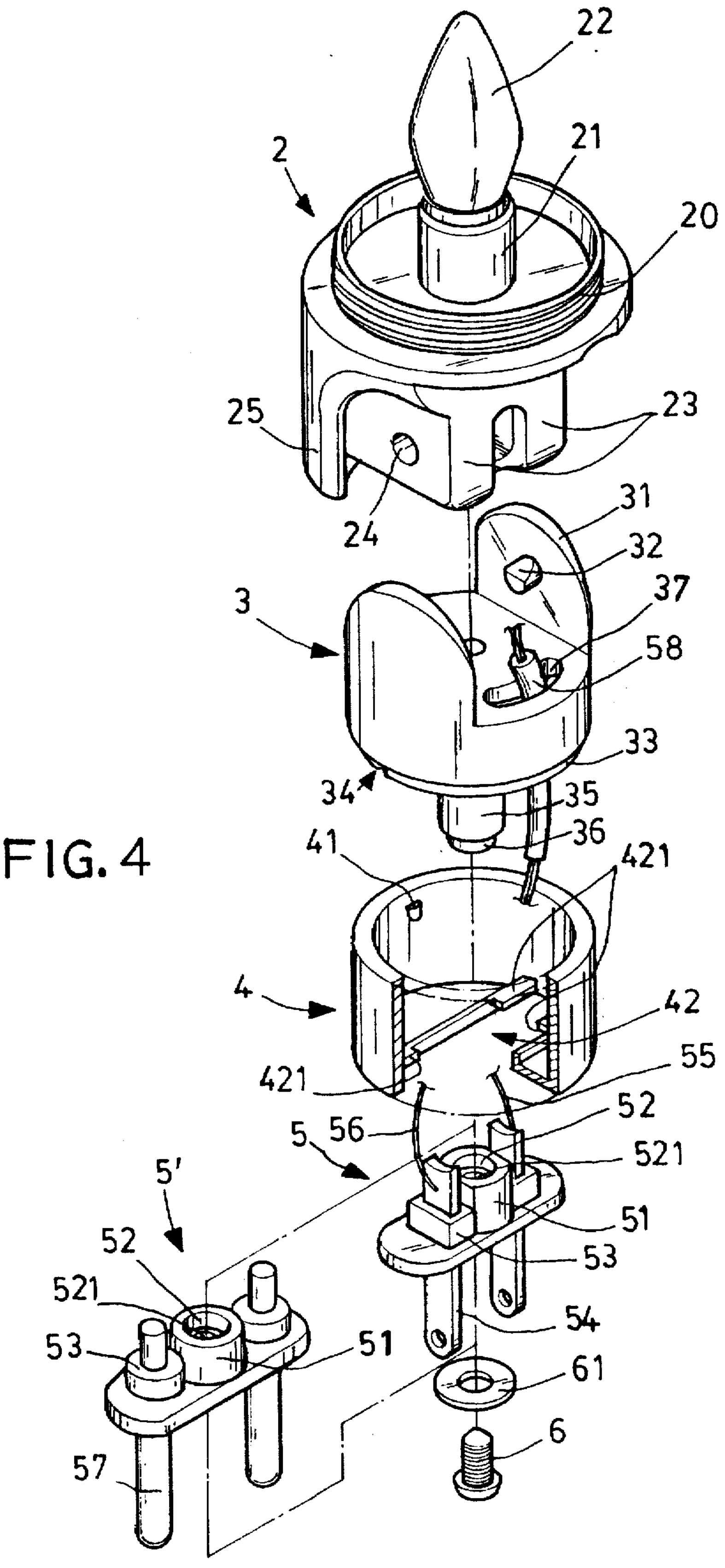
FIG. 4 is an exploded view of the lamp socket and plug assembly shown in FIG. 2.

Referring to FIGS. 2, 3, and 4, a lamp socket and plug assembly in accordance with the present invention is generally comprised of a lamp socket 2, an adapter 3, a plug holder 4, a plug 5 or 5', a screw bolt 6, and a washer 61.

The lamp socket 2 comprises an upright lamp base holder 21 disposed at the top, which holds the base of a lamp bulb 22, a threaded annular flange 20 disposed around the lamp base holder 21 for mounting a lampshade, two downward coupling blocks 23 disposed at the bottom in a parallel relation, two pivot holes 24 alinged on the downward coupling blocks 23, a downward locating wall 25 peripherally disposed at one side, and a switch 26 mounted on the downward locating peripheral wall 25.

The adapter 3 is a hollow cylinder having a bottom open end, two upright lugs 31 bilaterally raised from the top and respectively attached to the coupling blocks 23 of the lamp socket 2 at an outer side, two inward pivot pins 32 respectively raised from the upright lugs 31 at an inner side and respectively inserted into the pivot holes 24 on the coupling blocks 23, a downward annular coupling flange 33 of reduced diameter raised from the bottom, a locating groove 34 around one fourth of the periphery of the downward annular coupling flange 33, an internally threaded downward center tube 35 extending out of the downward annular coupling flange 33 and terminating in a neck 36, and an arched slot 37 at the top. When the adapter 3 and the lamp socket 2 are coupled together, the lamp socket 2 can be turned about the pivot pins 32 of the adapter 3.

The plug holder 4 is a hollow cylinder having a top open end coupled to the coupling flange 33 of the adapter 3, a raised portion 41 raised from the inside wall and forced into engagement with the locating groove 34 of the adapter 3 to limit the rotary motion of the adapter 3 relative to the plug holder 4 within 90° (because the locating groove 34 extends over one fourth of the periphery of the coupling flange 33), an elongated slot 42 at the bottom, and inward locating flanges 43 bilaterally projecting into the elongated slot 42.

The plug 5 is inserted into the elongated slot 42 of the plug holder 4 and retained in place by the locating flanges 43, comprising an upright coupling block 51, a coupling hole 52 defined within the upright coupling block 51, which receives the downward center tube 35 of the adapter 3, an inside annular flange 521 raised around the periphery of the coupling hole 52, two blade holders 53 at two opposite sides of the upright coupling block 51, two metal blades 54 respectively fastened to the blade holders 53 and respectively connected to the two conductors 55, 56 of an electric wire 58 for the connection of the ring contact and tip contact of the lamp bulb 22.

The washer 61 is mounted around the screw bolt 6. The screw bolt 6 is inserted into the coupling hole 52 of the upright coupling block 51 from the bottom side and threaded into the internally threaded downward center tube 35 of the adapter 3 to fix the plug 5 to the adapter 3 and to secure the washer 61 in place.

The metal blades 54 of the plug 5 are flat blades. As an alternate form of the present invention, the metal blades 57 of the plug 5' are rounded blades.

Referring to FIGS. 5 to 10 and FIG. 4 again, the lamp socket 2 is pivotably connected to the adapter 3 by fastening the pivot holes 24 of the coupling blocks 23 to the pivot pins 32 of the upright lugs 31, then the downward coupling flange 33 of the adapter 3 is inserted into the plug holder 4, permitting the raised portion 41 to be forced into engagement with the locating groove 34 of the downward coupling flange 33, and then the plug 5 or 5' is fastened to the adapter 3 by inserting the internally threaded downward center tube 35 into the coupling hole 52 of the upright coupling block 51 and threading the screw bolt 6 into the internally threaded center tube 35, permitting the washer 61 to be retained between the head of the screw bolt 6 and the inside annular flange 521 of the upright coupling block 51. When assembled, the neck 36 of the downward center tube 35 projects over the bottom side of the inside annular flange 521 at a suitable distance, therefore a gap S is left between the bottom side of the inside annular flange 521 and the washer 61. This gap S allows the plug holder 4 to be turned relative to the adapter 3. Furthermore, the electric wire 58 is inserted through the arched slot 37 of the adapter 3, one conductor 56 of the electric wire 58 is connected to the side metal contact plate 211 of the lamp base holder 21, and the other conductor 55 of the electric wire 58 is connected to one terminal 261 of the switch 26. The other terminal 262 of the switch 26 is connected to the center metal contact plate 212 of the lamp base holder 21 by a conductor 263. Therefore, the switch 26 can be controlled to turn on/off the lamp bulb 22.

Referring to FIG. 6 again, the lamp socket 2 can be turned about the pivot pins 32 of the adapter 3 so that the lamp 22 can be disposed in a vertical position in alignment with the plug 5 in the axial direction, or a horizontal position perpendicular to the longitudinal central axis of the plug 5.

Referring to FIG. 7 again, the adapter 3 further comprises two raised portions, namely, the first raised portion 341 and the second raised portion 342 near two opposite ends of the locating groove 34. The plug holder 4 can be turned relative to the adapter 3 within 90° and retained between two positions by forcing the raised portion 41 of the plug holder 4 into engagement with the first raised portion 341 or second raised portion 342 of the adapter 3.

Figure 5:
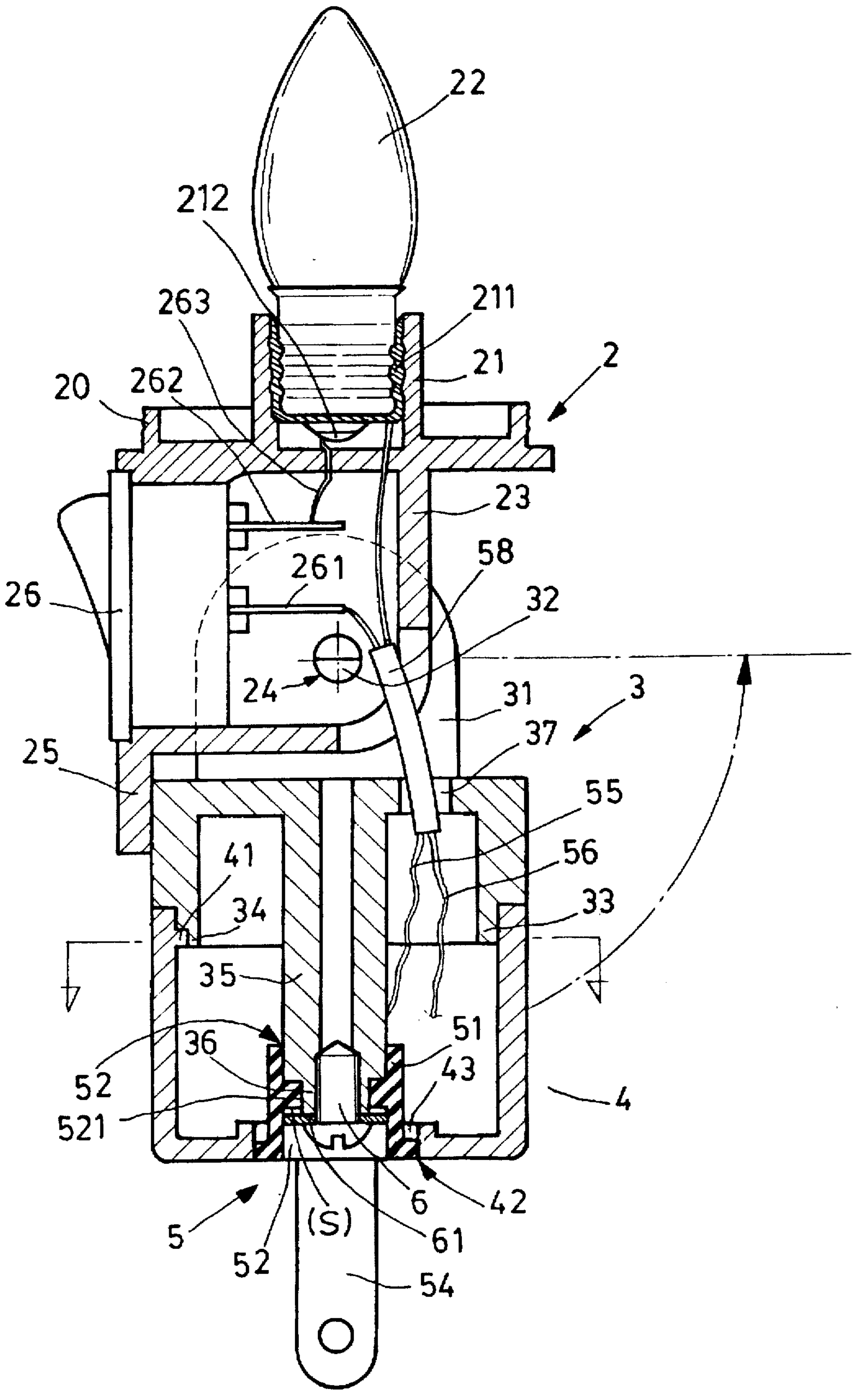
FIG. 5 is a sectional view in an enlarged scale of FIG. 3.
Figure 6:
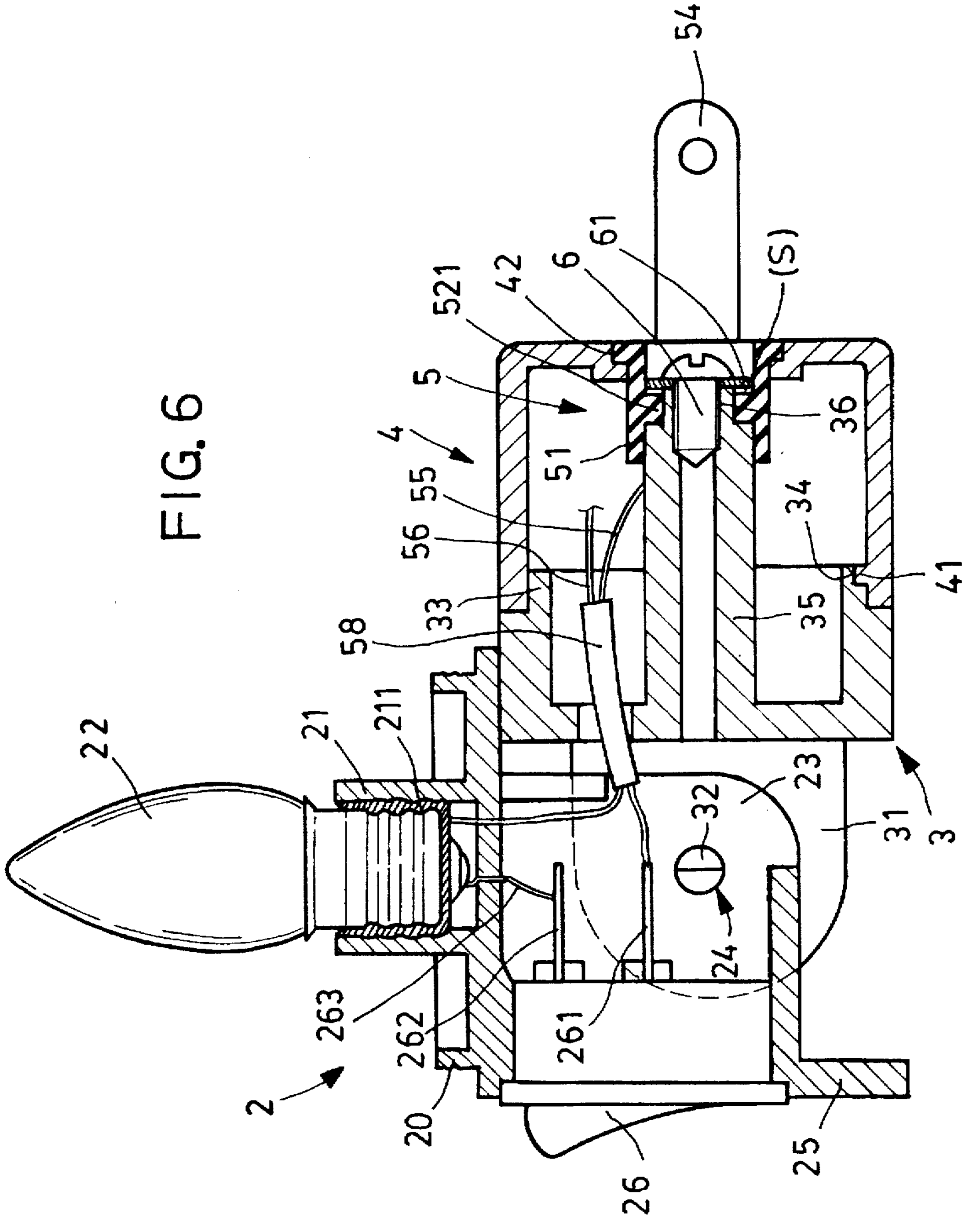
FIG. 6 is another sectional view of the lamp socket and plug assembly of the present invention, showing the plug turned from the vertical position to the horizontal position.
Figure 7:
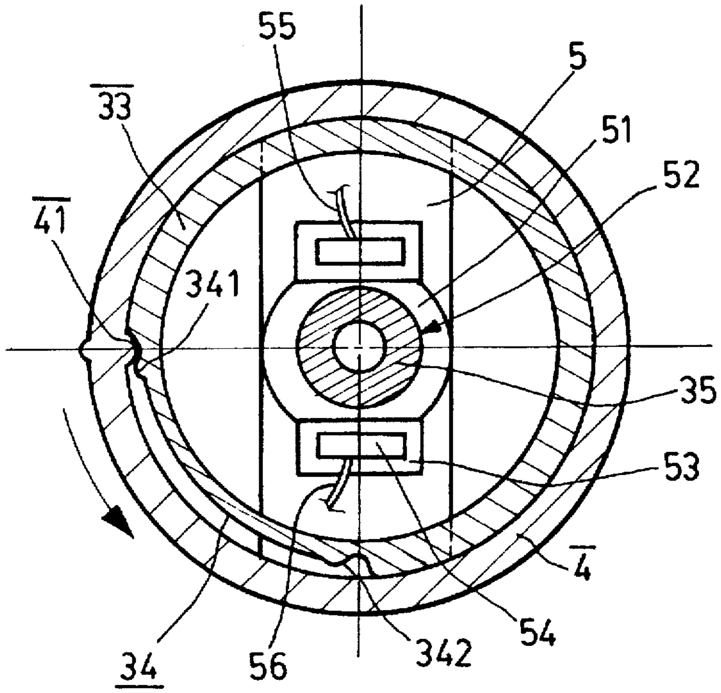
FIG. 7 is a sectional view taken along line 7—7 of FIG. 5.
Figure 8:
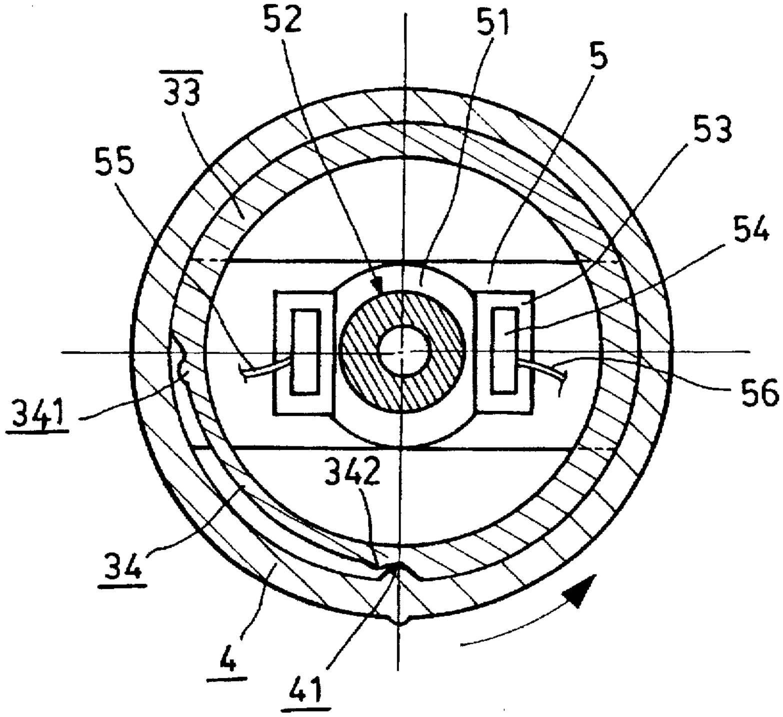
FIG. 8 is similar to FIG. 7 but showing the raised portion of the plug holder moved from the first raised portion at one end of the locating groove into engagement with the second raised portion.
Figure 9:
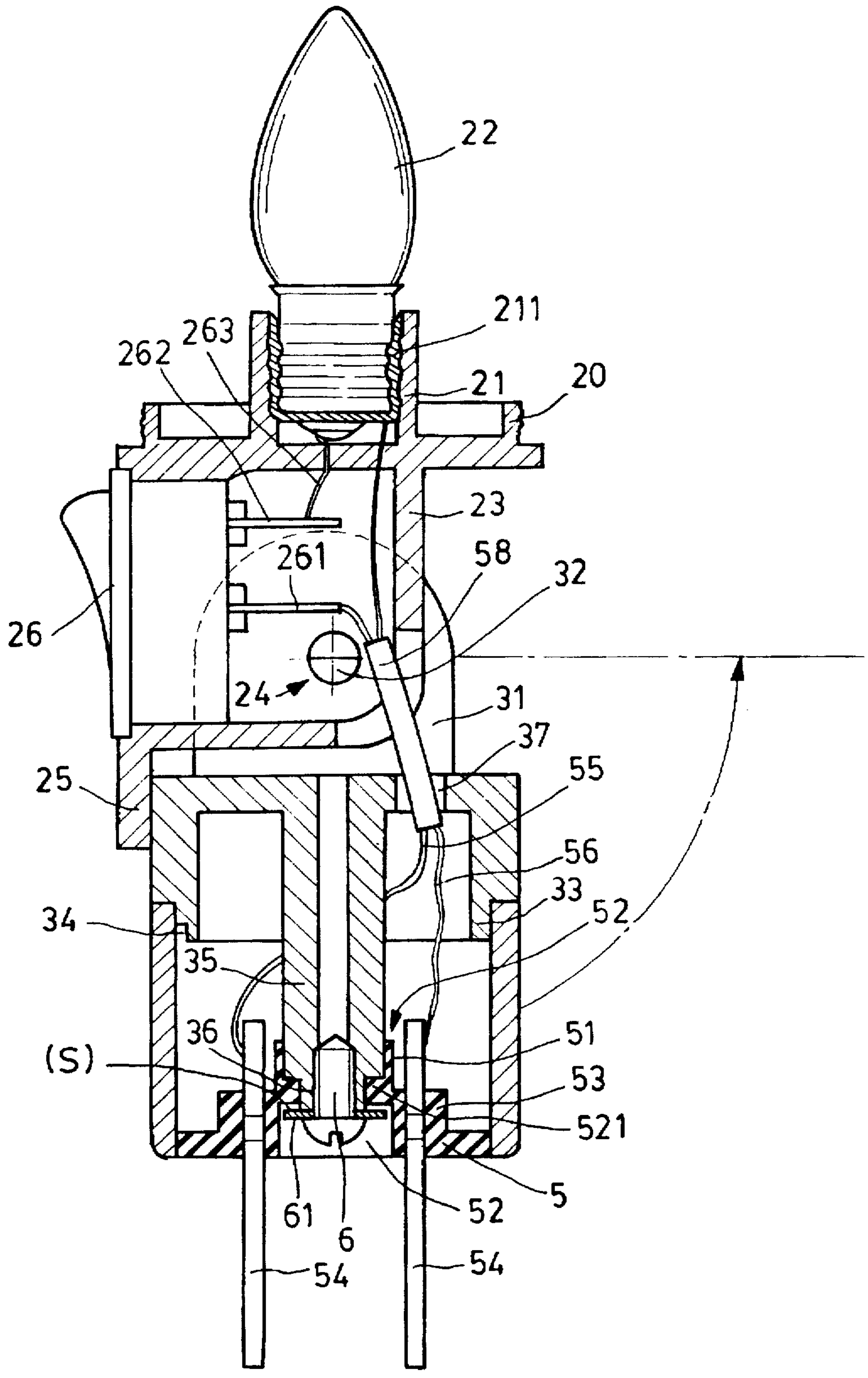
FIG. 9 is similar to FIG. 5 but showing the plug holder and the plug turned through 90° relative to the adapter.

Referring to FIG. 7, when the raised portion 41 of the plug holder 4 is forced into engagement with the first raised portion 341 of the adapter 3, the two metal blades 54 are vertically spaced (see also FIG. 5).

Referring to FIGS. 8 and 9 again, when the raised portion 41 of the plug holder 4 is forced into engagement with the second raised portion 342 of the adapter 3, the two metal blades 54 are horizontally spaced.

Figure 10:
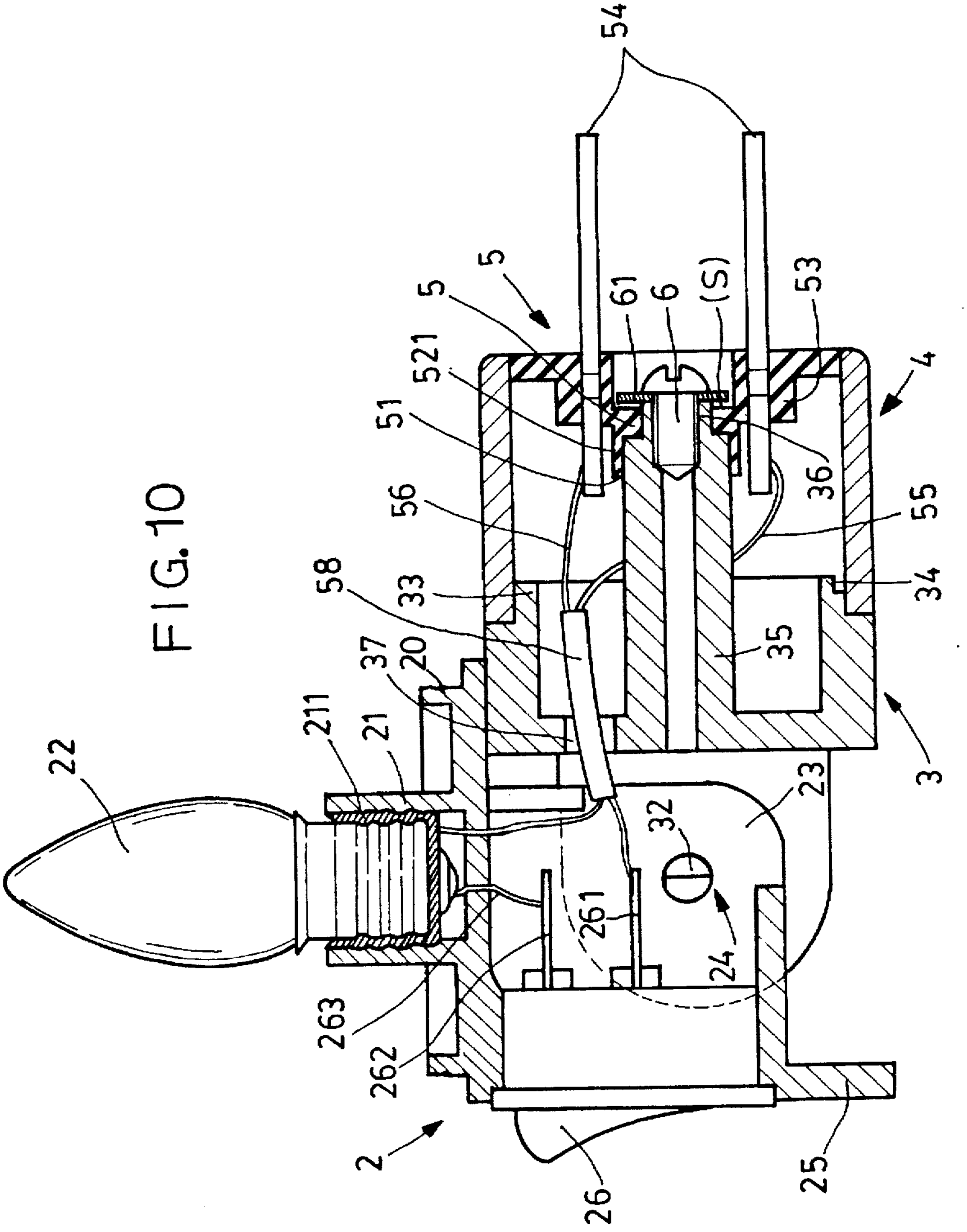
FIG. 10 is similar to FIG. 6 but showing the plug holder and the plug turned through 90° relative to the adapter.

Referring to FIG. 10, the plug holder 4 and the adapter 3 are turned through 90° relative to the lamp socket 2, and therefore the plug 5 and the lamp bulb 22 are disposed at right angles.

As indicated, the lamp socket and plug assembly can be alternatively set into different forms to fit different mounting positions by turning the lamp socket 2 vertically relative to the adapter 3 and turning the adapter horizontally relative to the plug holder 4.

Figure 11:
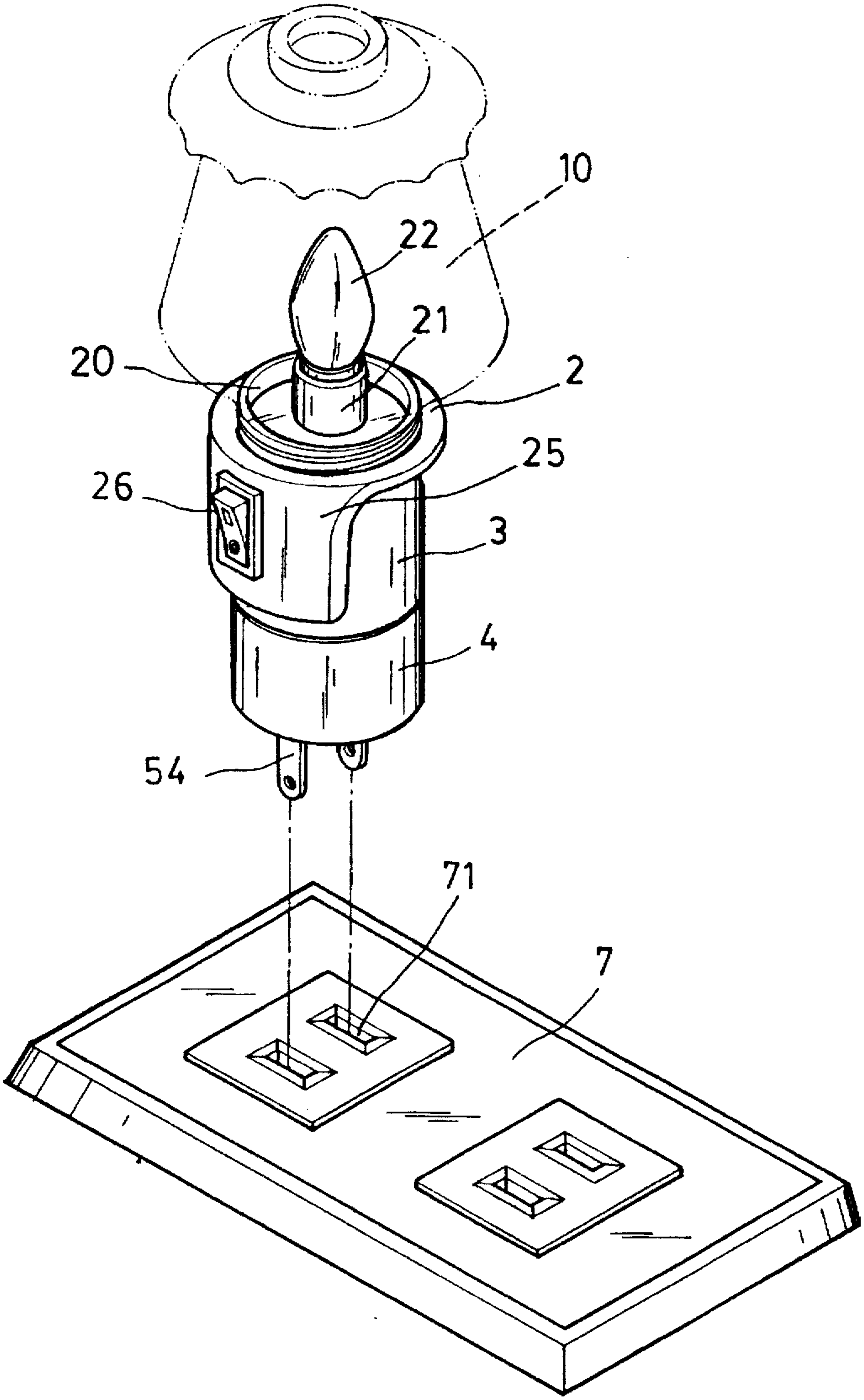
FIG. 11 is an applied view of the present invention, showing the lamp socket and the adapter axially aligned for installation in a horizontally installed electric socket.
Figure 12:
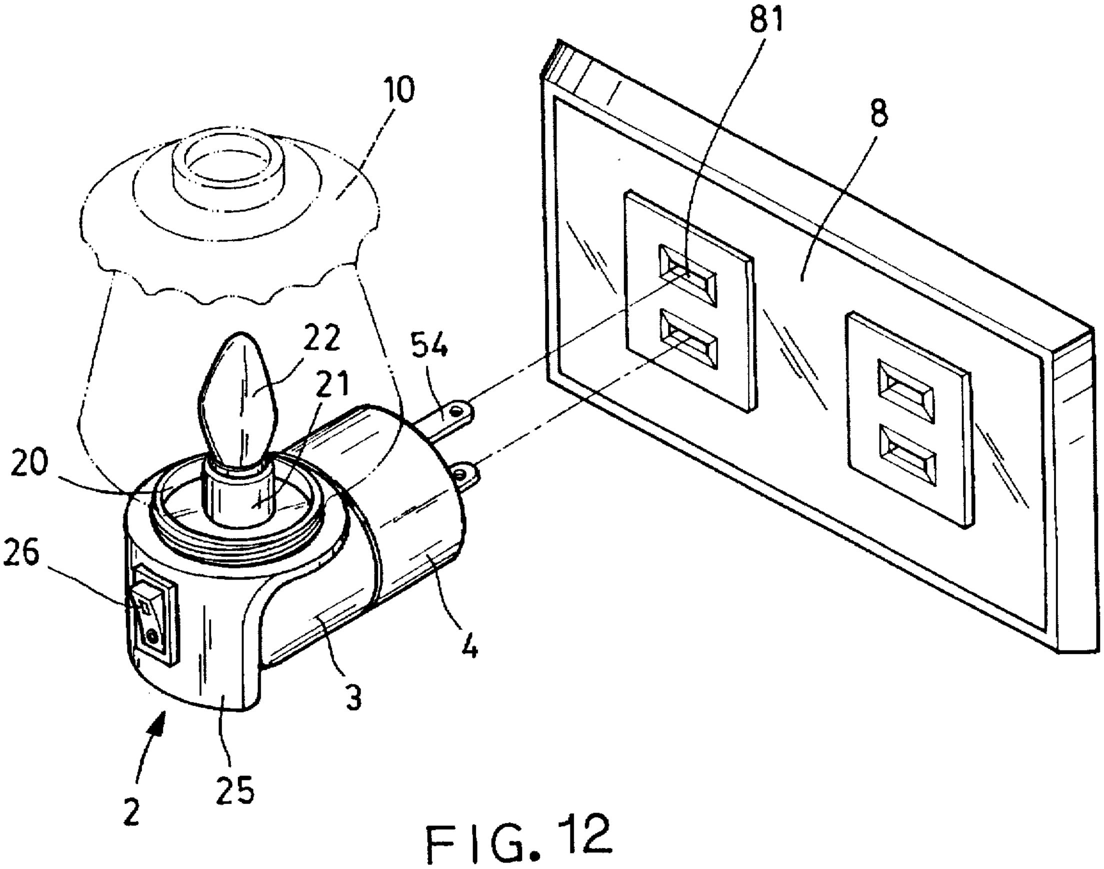
FIG. 12 is another applied view of the present invention, showing the lamp socket and the adapter disposed at right angles for installation in the vertically spaced plug holes of a vertically installed electric socket.
Figure 13:
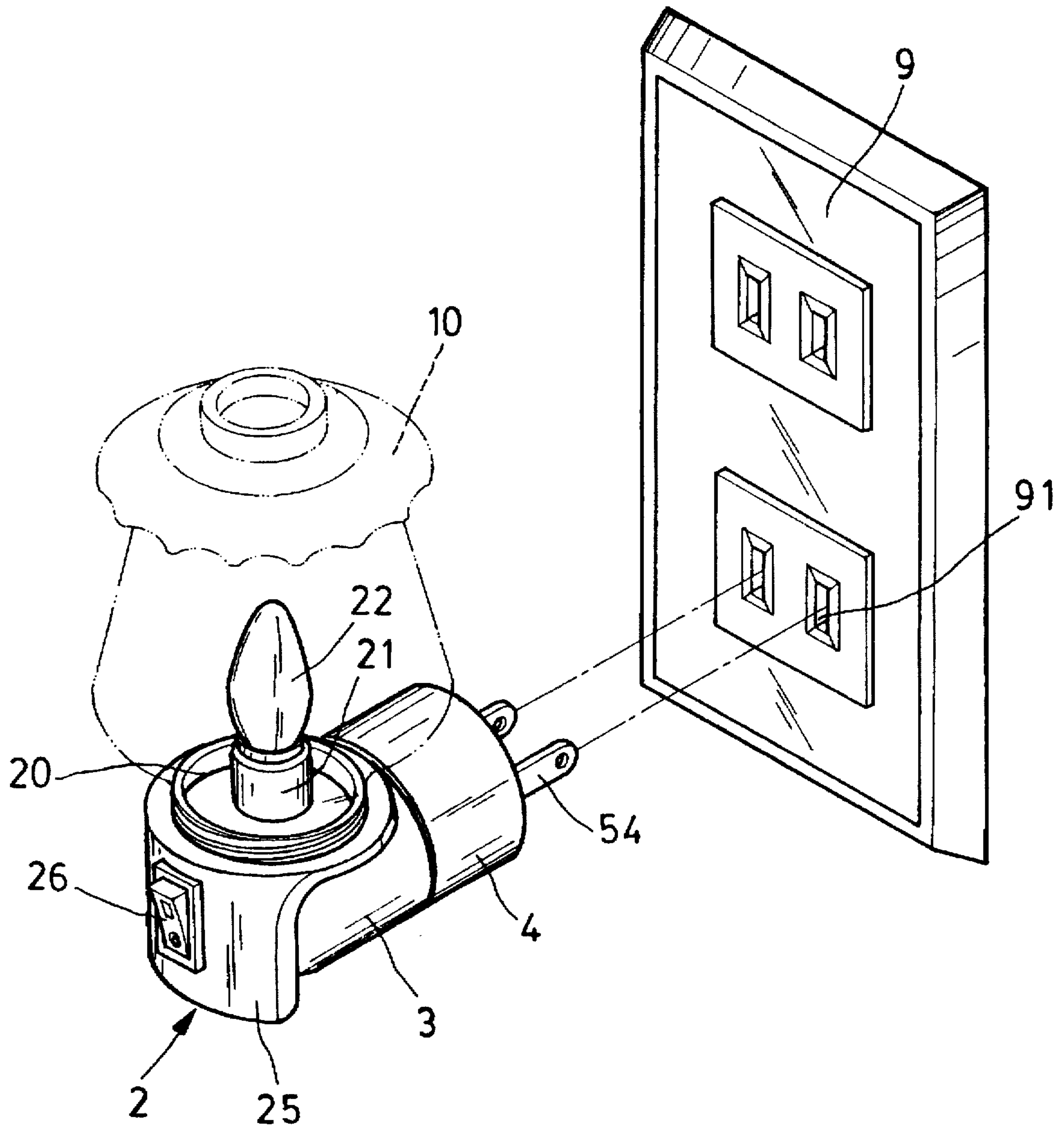
FIG. 13 is still another applied view of the present invention, showing the lamp socket and the adapter disposed at right angles and the plug turned through 90° for installation in the horizontally spaced plug hole of a vertically installed electric socket.

FIGS. 11 to 13 show three application examples of the present invention. In the application example shown in FIG. 11, the lamp socket 2 is axially aligned with the adapter 3 and the plug holder 4, and the metal blades 54 are respectively inserted into the plug holes 71 of the horizontally installed electric socket 7. In the application example shown in FIG. 12, the lamp socket 2 and the adapter 3 are disposed at right angles, and the metal blades 54 are respectively inserted into the vertically spaced plug holes 81 of the vertically installed electric socket 8. In the application example shown in FIG. 13, the lamp socket 2 and the adapter 3 are disposed at right angles, and the plug holder 4 is turned through 90° relative to the adapter 3 for permitting the metal blades 54 to be respectively inserted into the horizontally spaced plug holes 91 of the vertically installed electric socket 9.

It is to be understood that the drawings are designed for purposes of illustration only, and are not intended as a definition of the limits and scope of the invention disclosed.

What the invention claimed is:

1. A lamp socket and plug assembly comprising:

a lamp socket, said lamp socket including (1) an upright lamp base holder extending from a top side thereof to hold a lamp bulb, said lamp base having a side metal contact and a center metal contact for the connection of the ring contact and tip contact of the lamp bulb, (2) a threaded annular flange extending from the top side of said lamp socket around said lamp base holder for mounting a lampshade, (3) two downward coupling blocks extending from a bottom side thereof, said two downward coupling blocks having a pair of aligned pivot holes respectively formed therein, (4) a downward locating wall peripherally disposed at one side of said lamp socket, and (5) a switch mounted on said downward locating peripheral wall;

an adapter pivotally coupled to said lamp socket, said adapter including (1) a hollow cylindrical body having an open bottom end, (2) two upright lugs extending from a closed upper end of said cylindrical body on opposing sides thereof, (3) two inwardly directed pivot pins respectively extending from an inner side of said upright lugs and respectively inserted into the pivot holes formed in said coupling blocks of said lamp socket for permitting said lamp socket to be within 90° with respect to said adapter, (4) a downward annular coupling flange of reduced diameter extending from a bottom side thereof, said downward annular coupling flange having a locating groove formed therein and extending around one fourth of a periphery thereof, (5) an internally threaded center tube extending downwardly from said downward annular coupling flange and terminating in a neck, and (6) an arcuate slot formed through said closed upper end;

a plug holder coupled to said adapter, said plug holder including a hollow cylinder having an open top end coupled to said downward annular coupling flange of said adapter, said hollow cylinder having a raised portion on an interior thereof for engagement with said locating groove of said adapter to limit within 90° a rotary motion of said adapter relative to said plug holder, said hollow cylinder having an elongated slot formed through a bottom side thereof;

a plug fastened to the elongated slot of said plug holder, said plug including (1) an upright coupling block having a coupling hole formed therein for receiving said downward center tube of said adapter therein, (2) two blade holders disposed on two opposite sides of said upright coupling block, and (3) two metal blades respectively fastened to said blade holder for connection to said lamp socket;

means for electrically coupling said metal blades respectively to said side and center metal contacts through said switch irrespective of a pivotal and rotative displacement of said lamp socket relative to said adapter; and a screw bolt mounted with a washer and inserted into the coupling hole of said upright coupling block and threaded into the internally threaded downward center tube of said adapter to fix said plug to said adapter.

2. The lamp socket and plug assembly of claim 1 wherein said plug holder further comprises pairs of inward locating flanges bilaterally projecting into said elongated slot to hold said plug in said elongated slot.

3. The lamp socket and plug assembly of claim 1 wherein said plug further comprises an inside annular flange raised from said upright coupling block inside said coupling hole for the passing of the neck of the downward center tube of said adapter.

4. The lamp socket and plug assembly of claim 3 wherein the neck of the downward center tube of said adapter downwardly projecting over the lowest edge of the inside annular flange of said upright coupling block at a distance so that said plug can be turned with said adapter relative to said plug holder.

* * * * *